US012781940B2

(12) United States Patent
Hohmann et al.

(10) Patent No.: US 12,781,940 B2
(45) Date of Patent: Nov. 3, 2026

(54) LIGHTING DEVICE FOR VEHICLES

(71) Applicant: Hella GmbH & Co. KGaA, Lippstadt (DE)

(72) Inventors: Carsten Hohmann, Warstein (DE); Martin Mügge, Geseke (DE); Burkhard Peitz, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/188,115

(22) Filed: Apr. 24, 2025

(65) Prior Publication Data

US 2025/0334246 A1 Oct. 30, 2025

(30) Foreign Application Priority Data

Apr. 30, 2024 (DE) ........................ 102024112051.7

(51) Int. Cl.

*F21S 43/20* (2018.01)
*B29D 11/00* (2006.01)
*B60Q 1/34* (2006.01)
*F21S 43/249* (2018.01)

(52) U.S. Cl.

CPC ...... *F21S 43/249* (2018.01); *B29D 11/00692* (2013.01); *B60Q 1/34* (2013.01)

(58) Field of Classification Search

None
See application file for complete search history.

(56) References Cited

U.S. PATENT DOCUMENTS

| | | | | |
|---|---|---|---|---|
| 10,473,303 | B1 * | 11/2019 | Wasilewski | F21V 17/10 |
| 12,049,989 | B2 * | 7/2024 | Hagedorn | F21S 41/25 |
| 2003/0222772 | A1 * | 12/2003 | Laufer | B60Q 1/0023 340/435 |
| 2014/0169016 | A1 * | 6/2014 | Kirchner | F21S 43/239 362/511 |

FOREIGN PATENT DOCUMENTS

| | | | |
|---|---|---|---|
| AT | 355138 | B | 2/1980 |
| DE | 202012004965 | U1 | 6/2012 |
| DE | 102013001027 | A1 | 8/2013 |
| DE | 102012210443 | A1 | 12/2013 |
| DE | 102012112072 | A1 | 6/2014 |
| DE | 102015204303 | A1 | 9/2015 |
| DE | 102016124110 | A1 | 6/2017 |
| DE | 102019110776 | A1 | 11/2019 |
| DE | 102019216478 | A1 | 4/2021 |
| EP | 3201523 | B1 | 3/2021 |

* cited by examiner

*Primary Examiner* — Thien M Le
*Assistant Examiner* — April A Taylor
(74) *Attorney, Agent, or Firm* — Husch Blackwell LLP

(57) ABSTRACT

A lighting device for vehicles is provided with a housing, a cover lens covering an opening in the housing, a light module containing a number of light sources, and an optical unit for generating a predefined light distribution. The optical unit contains an optical waveguide that has a light entry surface and a light emitting surface. The optical waveguide is connected to the cover lens. A first section of the optical waveguide, facing the light source, protrudes from the inner surface of the cover lens, or the light entry surface of the optical waveguide is flush with the inner surface of the cover lens. A second section of the optical waveguide, facing away from the light source, protrudes from the outer surface of the cover lens, or the light emitting surface of the optical waveguide is flush with the outer surface of the cover lens.

14 Claims, 4 Drawing Sheets

LIGHTING DEVICE FOR VEHICLES

CROSS REFERENCE

This application claims priority to German Application No. 10 2024 112051.7, filed Apr. 30, 2024, the entirety of which is hereby incorporated by reference.

FIELD OF THE INVENTION

The invention relates to a lighting device for vehicles that has a housing, a cover lens that covers an opening in the housing, a light module that contains numerous light sources, and an optical unit for generating a predefined light distribution, in which the optical unit contains an optical waveguide that has a light entry surface and a light emitting surface.

BACKGROUND OF THE INVENTION

DE 10 2012 112 072 A1 discloses a lighting device for vehicles that has a light module containing a light source and an optical element for generating a predefined light distribution. The light module is in an interior space in the lighting device that is delimited by a housing and a cover lens through which light can pass that covers an opening in the housing. The optical unit in front of the light sources in the main beam emission direction thereof comprises a lens that is substantially parallel to the cover lens, which has grooves for an optical waveguide and a shutter. The optical waveguide is substantially perpendicular to the cover lens and forms a flat waveguide with a light entry surface on one narrow side and a light emitting surface on another narrow side. Parallel surfaces where the light undergoes total internal reflection connect the light entry surface and light emitting surface. The light emitting surface on the optical waveguide is near the inner surface of the cover lens. When the lighting device is placed in an opening in the body of the vehicle in which the cover lens is at an acute angle to the main beam emission direction of the lighting device, the light may undergo total internal reflection at the inner surface of the cover lens, such that the light emitted through the light emitting surface of the optical waveguide may have a negative impact on the light distribution. Moreover, the light reflected by the cover lens may also be reflected on the adjacent shutter, disrupting the desired lighting signature. It is therefore desirable to generate a distinct and defined lighting signature.

A lighting device for vehicles is disclosed in EP 3 201 523 B1 that is next to a radiator grille on a vehicle. The interior of the lighting device is formed by a housing and a cover lens through which light can pass that covers an opening in the housing. The lighting device contains a light source and a reflector for generating a predefined turn signal. The cover lens also has optical bars representing extensions of the horizontal bars forming the grille, which extend from an outer surface of the cover lens. This results in a uniform appearance on the front end of the vehicle, composed of the grille and the lighting device. Light generated by the light source for the signal function passes through both the light rods and the adjacent surface of the cover lens.

BRIEF SUMMARY OF THE INVENTION

The object of the present invention is to improve a lighting device with an optical waveguide for vehicles with which a specific lighting function can be obtained simply and inexpensively, particularly without light losses.

In an example embodiment, the optical waveguide is connected to the cover lens, and a first part of the optical waveguide, facing the light source, protrudes from the inner surface of the cover lens, or the light entry surface of the optical waveguide is flush with the inner surface of the cover lens, and a second part of the optical waveguide, facing away from the light source, protrudes from the outer surface of the cover lens, or the light emitting surface of the optical waveguide is flush with the outer surface of the cover lens.

The invention involves integrating an optical waveguide in a cover lens for the lighting device. The light passing through the optical waveguide is thus emitted directly into the environment of the lighting device, or vehicle, such that an effective lighting or signal function is obtained. Disruptive reflections on the cover lens are prevented in this manner, because the light emitting surface is on the outer surface of the cover lens. This also reduces light losses. Because only part of the optical waveguide, if any, is inside the lighting device, a thin lighting device is obtained. Because the light is emitted by the optical waveguide directly into the environment, a distinct and undistorted lighting signature is generated. This is obtained exclusively by the light emitting surface on the optical waveguide.

According to one aspect of the invention, the optical waveguide is an integral part of the cover lens. Both components can advantageously be produced in a single step, e.g. in an injection molding process. This reduces the number of components and tools. It also simplifies assembly.

According to another aspect of the invention, a light-directing optical element is placed upstream of the optical waveguide. This optical element is between the light source and the light entry surface on the optical waveguide, and directs the light from the light sources into the optical waveguide. Disruptive diffusion passing by the optical waveguide is prevented in this manner.

According to another aspect of the invention, the light emitting surface of the optical waveguide has a diffusing structure, or optical structure. This advantageously enables the lighting device to satisfy legal requirements regarding the horizontal lighting width of the lighting function.

According to another aspect of the invention, the light emitting surface of the optical waveguide has a diffusing optical structure with numerous micro-optical elements in the millimeter range. By way of example, their width and/or height can be less than 1 mm, preferably less than 0.5 mm. This advantageously results in diffusion, in particular horizontally, without the diffusing structure being apparent to an observer, in particular when the lighting device is not in use. A desired diffusion can also be obtained with a diffusing structure that can be formed through etching, grinding, or with laser processing, instead of the micro-optical elements.

According to another aspect of the invention, the cover lens and optical waveguide are obtained in a two-component injection molding process, in which at least part of the back surface of the cover lens is a black or opaque component material. This black or opaque component material surrounds the transparent optical waveguide. This visually isolates the optical waveguide from adjacent parts of the cover lens. This also advantageously prevents undesired diffusion caused by light sources in other light module within the lighting device.

According to another aspect of the invention, the optical waveguide crosses through the cover lens. This takes place in a transparent first part of the cover lens. The cover lens also has a second transparent section at a spacing thereto through which light from a second light module within the lighting device can be emitted. The cover lens thus has different windows through which light for different functions can pass.

According to another aspect of the invention, the optical waveguide is a flat waveguide with a narrow light entry surface and a narrow light emitting surface. This optical waveguide can be integrated in the cover lens in a space-saving manner to generate a signal function.

According to another aspect of the invention, at least part of the flat surface of the optical waveguide on the outside of the lighting device has a diffusing structure with which a supplementary lateral light emission is obtained. This lateral light emission can be used to generate a lateral light function. The light emitting narrow surface generates a main signal function, e.g. daytime running lights or taillights.

According to another aspect of the invention, the outer surface of the cover lens has a diffusing structure. This diffuses the light from the second light module in a defined manner.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
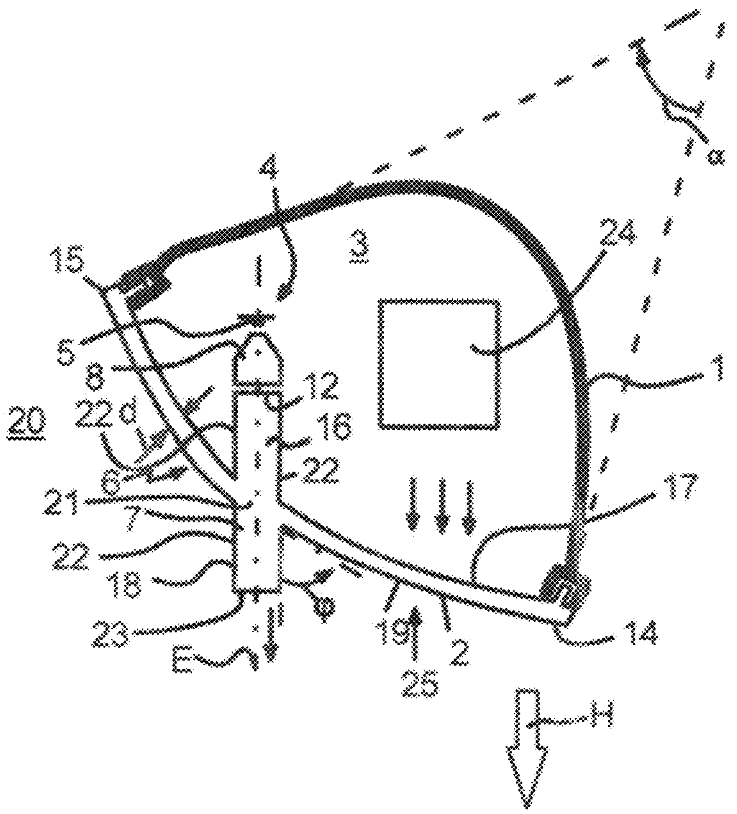
FIG. 1 shows a schematic illustration of a lighting device from above.
Figure 2:
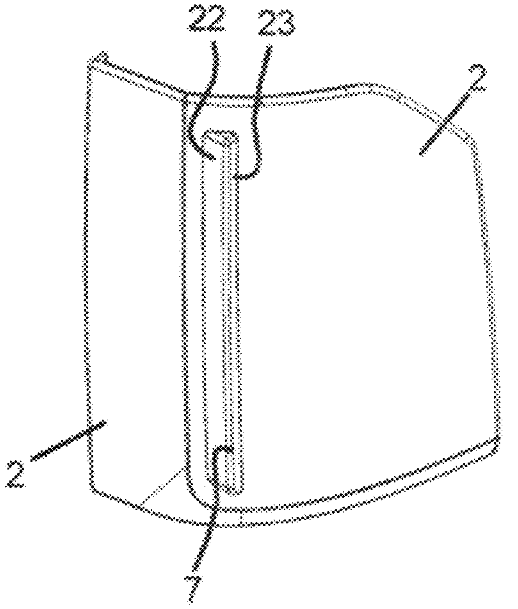
FIG. 2 shows a perspective view of a cover lens for the lighting device that has an integrated optical waveguide, seen diagonally from the front.
Figure 3:
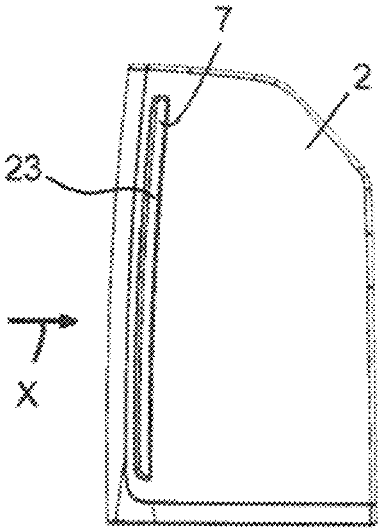
FIG. 3 shows a front view of the cover lens in FIG. 2.
Figure 4:
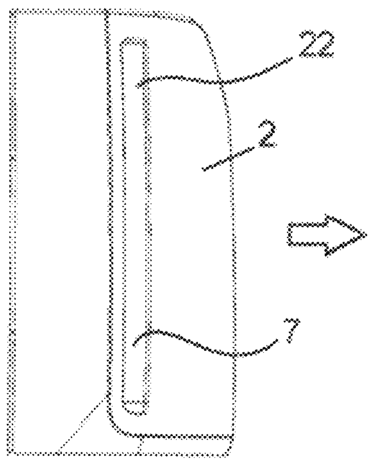
FIG. 4 shows a side view of the cover lens in FIG. 2, from the direction indicated by the X in FIG. 3.

A lighting device for vehicles can be at the front or back of the vehicle. In the present exemplary embodiment, shown in FIG. 1, the lighting device has a housing 1 and a cover lens 2 that covers an opening in the housing 1, such that the housing 1 and cover lens 2 delimit an interior 3.

Signal lights, e.g. turn signals or daytime running lights, are generated by a first light module 4 that has a light source 5 and an optical unit 6 for generating a predefined light distribution. The optical unit 6 contains an optical waveguide 7 and an upstream light-directing optical element 8. The optical waveguide is a flat waveguide, extending in a plane E. This extension plane E is vertical in the present exemplary embodiment.

Figure 5:
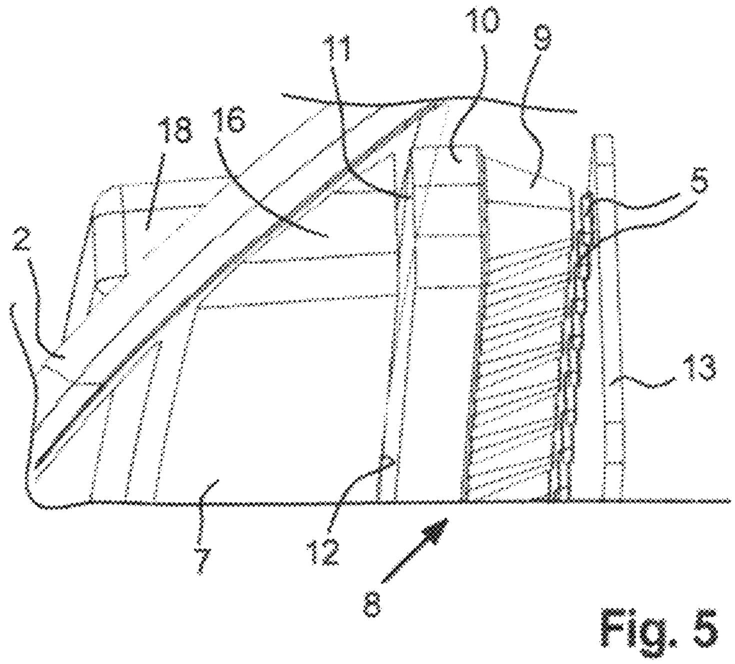
FIG. 5 shows an enlargement of the part of the lighting device containing the optical waveguide from above.

The light-directing optical element 8 is placed behind the optical waveguide 7 in the main beam emission direction H for the lighting device. As FIG. 5 shows, the light-directing optical element 8 has a cone-shaped diffusion section 9 on the side facing the light source 5, and an adjacent adjustment section 10 that has a light emitting surface 11 that is aligned with the narrow light entry surface 12 on the optical waveguide 7 in the present exemplary embodiment. This ensures that all of the light emitted by the light sources 5 strikes the light entry surface 12 on the optical waveguide 7. The light sources 5 are placed in a straight line on a printed circuit board 13, aligned with the shape of the light entry surface 12 on the optical waveguide 7. The light sources 5 and light-directing optical element 8 thus follow the contour of the light entry surface 12 on the optical waveguide 7. If the optical waveguide 7 is curved instead of flat, the light-directing optical element 8 and light sources 5 also follow a curved structure.

As FIG. 1 shows, the lighting device fits into a tapered cavity, and the cover lens 2 curves from the edge 14 on the inside toward an outer edge 15 that borders on the side of the vehicle body.

The optical waveguide 7 is integrated in the cover lens 2 to obtain the invention. In this exemplary embodiment, the optical waveguide 7 is an integral part of the cover lens 2, and is preferably formed by a transparent or colored material in an single-component injection molding process. The optical waveguide 7 passes through the cover lens 2 at an acute angle φ. The main beam emission direction H of the lighting device runs in plane of extension E for the optical waveguide 7. The cover lens 2 and optical waveguide 7 form a cover lens/optical waveguide component that can be easily produced.

The optical waveguide 7 has a first part 16 protruding from the inner surface 17 of the cover lens 2, substantially into the interior 3 of the lighting device. The optical waveguide 7 also has a second part 18 protruding from the outer surface 19 of the cover lens 2, substantially into the environment 20 of the lighting device, i.e. into the exterior 20. The optical waveguide 7 also has an intersection 21 aligned with the contour of the inner surface 17 and outer surface 19 of the cover lens 2, if the optical waveguide 7 is not integrated in the cover lens 2. Because the cover lens 2 is integrally attached to the optical waveguide 7, this intersection 21 has no optical effect. It does not form an optical boundary, such that the optical effect of the optical waveguide is substantially obtained by the first part 16 and second part 18.

The optical waveguide 7 has opposing surfaces 22 in the first and second parts 16 and 18, at which light entering the optical waveguide 7 undergoes total internal reflection. Because the thickness d of the cover lens 2 is relatively thin, an undesired diffusion of the light exiting the intersection 21 of the optical waveguide 7 is relatively low.

The light entry surface 12 of the optical waveguide 7 forms an exposed end of the first part 16 of the optical waveguide in the interior 3. An exposed end of the second part 18 of the optical waveguide 7 forms the light emitting surface 23 thereof. Because the optical waveguide 7 is flat, the light entry surface 12 and light emitting surface 23 are parallel. Both the light entry surface 12 and light emitting surface 23 are the narrow surfaces of the optical waveguide, which are substantially narrower than the flat surfaces 22 of the optical waveguide.

The light emitting surface 23 of the optical waveguide 7 is preferably perpendicular to the main beam emission direction (H). By way of example, the light emitting surface 23 can be horizontal and/or at an angle or curved in relation to the main beam emission direction (H).

In the present exemplary embodiment shown in FIGS. 1 to 5, the optical waveguide 7, light-directing optical element 8 and numerous light sources 5 are all in the same plane E. The light-directing optical element 8 is between the light sources 5 and the optical waveguide 7.

The first light module 4, which contains the optical waveguide 7, extends in a part of the lighting device facing away from the central longitudinal plane of the vehicle, thus facing toward the side of the vehicle body. A second light module 24 is in an area facing the central longitudinal plane of the vehicle, which has an optical unit 6 for generating another predefined lighting function, e.g. a low beam or high beam lighting function, if the lighting device is a headlamp. While the light generated by the first light module 4 passes through a first part of the cover lens 2, which forms the intersection 21 of the optical waveguide 7, the light generated by the second light module 24 is conducted through a second part 25 of the cover lens 2, which is spaced apart from the first part 21. There is no overlapping of the light from the first light module 4 and second light module 24 at the cover lens 2.

Figure 8:
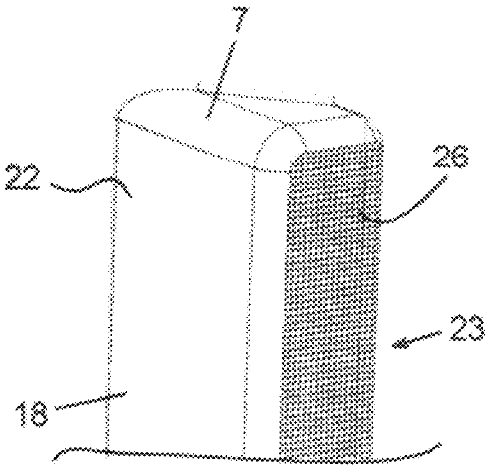
FIG. 8 shows an enlargement of an upper part of another embodiment of the optical waveguide shown in FIG. 2 integrated in the cover lens, in which the light emitting surface on the front of the lens has an optical structure.

To obtain an optimal signal function and an easily seen surface of the optical waveguide 7 where light is emitted, the light emitting surface of the optical waveguide has a diffusing structure 26, shown in the embodiment in FIG. 8. This diffusing structure 26 can be formed by micro-optics formed by numerous micro-optical elements, which rise from the surface of the optical waveguide 7, or are formed on the surface thereof. These micro-optical elements can be smaller than 1 mm, preferably smaller than 0.5 mm.

According to another embodiment of the invention, not shown in the drawings, the light entry surface 12 of the optical waveguide 7 can have a diffusing structure.

Figure 9:
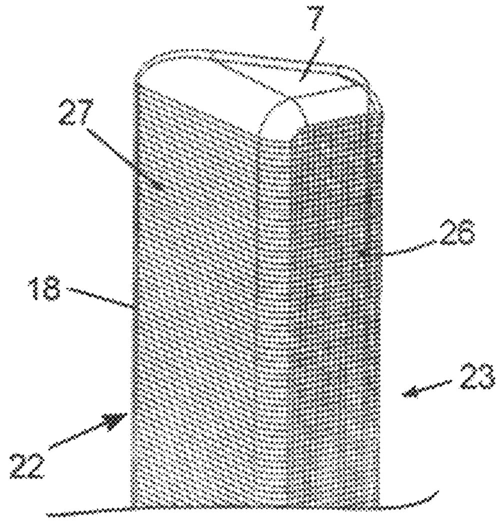
FIG. 9 shows another embodiment of the optical waveguide that has an optical structure on a lateral surface thereof, in addition to the optical structure on the light emitting surface on the front.

According to another embodiment of the optical waveguide 7, shown in FIG. 9, in addition to the diffusing structure 26 on the light emitting surface 23, a flat side 22 of the outer part 18 of the optical waveguide 7 can have a diffusing structure 27. This diffusing structure 27 can be formed by corrugations extending in the direction E. This diffusing structure 27 is preferably on the side of the optical waveguide 7 facing away from the central longitudinal plane of the vehicle, such that the light emitted from the outer surface 22 through the diffusing structure 27 can function as a side light. This results in an additional signal light.

Figure 6:
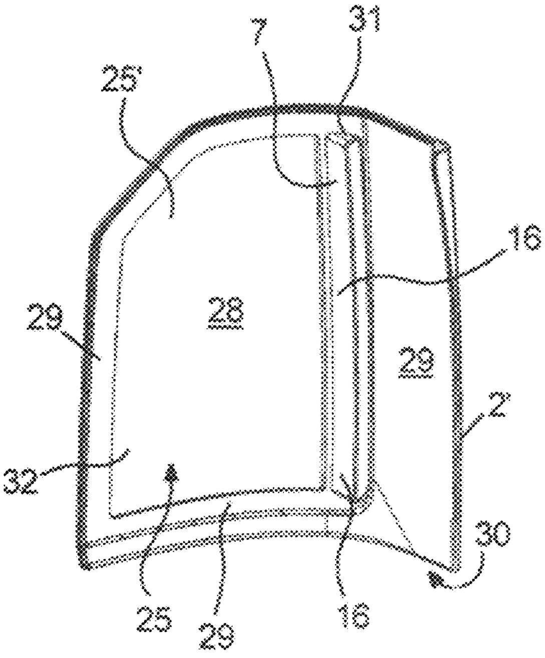
FIG. 6 shows another embodiment of the back of the cover lens/optical waveguide component, which is made of two different materials.
Figure 7:
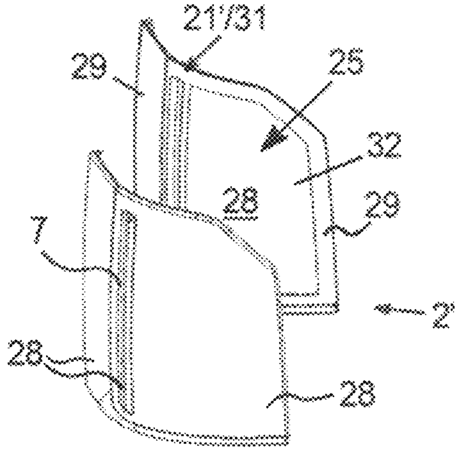
FIG. 7 shows a perspective view of the cover lens/optical waveguide component from the front, showing a black component and a transparent component in front of it, for purposes of simplicity.

In an alternative embodiment of the lighting device, or the cover lens shown in FIGS. 6 and 7, there is a second cover lens 2', which is produced with the integrated optical waveguide 7 in a two-component injection molding process. This cover lens 2' has a clear and/or transparent component material 28 and an opaque and/or black component material 29. The black component material 29 extends substantially along the back 30 of the cover lens 2', and basically forms a window for a first part 21' of the cover lens 2', and a second part 25' through which light from the first light module 4 and second light module 24 pass, respectively. Consequently, a first and second window 31 and 32 are formed on the back 30 of the cover lens 2', each of which contain the clear component material 28, and are surrounded by the black component material 29. This reduces undesired diffusion from the optical waveguide 7 into the intersection 21'. This also results in a dark appearance of the cover lens 2' when the lighting device is not in use.

In an alternative embodiment of the invention, not shown in the drawings, the optical waveguide 7 can contain only the second outer part 18, such that the light entry surface 12 of the optical waveguide 7 is flush with the inner surface 17 of the cover lens 2. This means that the light-directing optical element 8, or the light sources 5, can be closer to the cover lens 2, reducing the thickness of the lighting device.

According to another embodiment of the invention, not shown in the drawings, the optical waveguide 7 can contain just the first inner part 16, such that the light emitting surface 23 of the optical waveguide 7 is flush with the outer surface 19 of the cover lens 2. In this embodiment, the cover lens 2 advantageously has a homogenous and curved or flat outer surface 19.

According to another embodiment of the invention, not shown in the drawings, the light-directing optical element 8 is not formed by an additional optical waveguide, as shown in FIG. 5, but instead by a lens or reflector.

FIG. 1 shows that the cover lens 2 is curved in a plane that is perpendicular to the plane of extension E for the optical waveguide 7, from the inner edge 14 to the outer edge 15. The edges 14, 15 intersect at an angle $\alpha$ of 30° to 90°. This results in a lighting device that is pointed, in which a large part of the cover lens 2 is at an acute angle $\varphi$ to the main beam emission direction H for the lighting device.

Figure 10:
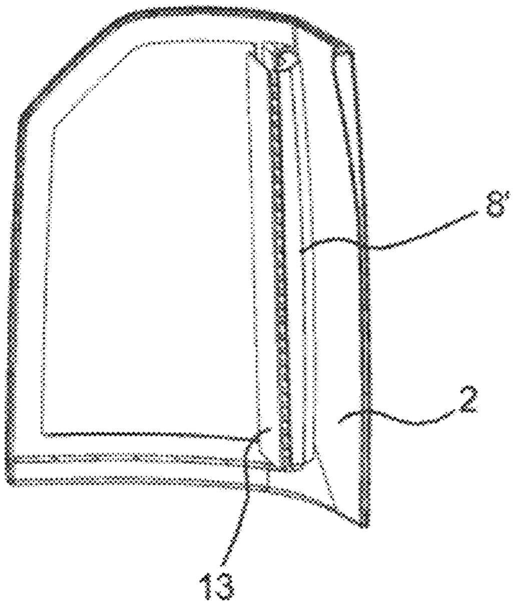
FIG. 10 shows another embodiment of the lighting device from the back in which the light enters a light-directing optical element from a direction transverse to the main beam emission direction.
Figure 11:
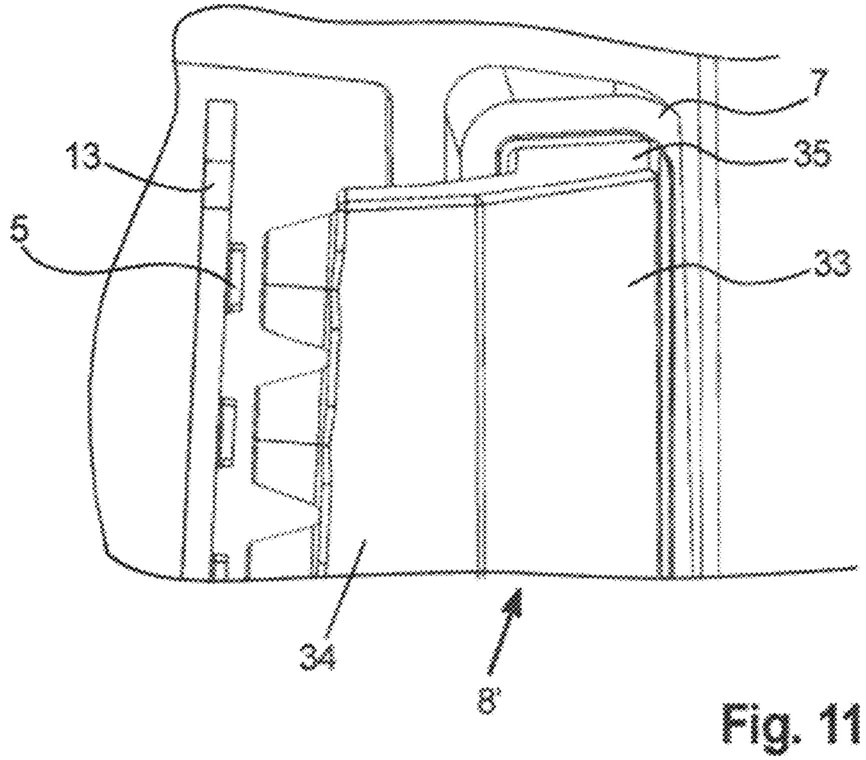
FIG. 11 shows an enlargement of the cover lens shown in FIG. 10 from the back.

Another embodiment of the invention, shown in FIGS. 10 and 11, differs from the preceding embodiments in that the optical waveguide 7 has another light-directing optical element 8'. This light-directing optical element 8' has a deflection segment 33 where the light entering the optical waveguide 8' is deflected 90° toward the light entry surface 12 on the optical waveguide 7. In this case, the light sources 5 can be at the side of the optical waveguide 7 and not in front of it. Optical axes of the light sources 5 in this embodiment are perpendicular to the plane of extension E of the optical wave guide 7, or perpendicular to the main beam emission direction H, while the optical axes of the light sources 5 in the embodiment shown in FIGS. 1 to 9 are located in the plane of extension E and in the main beam emission direction H. Upstream of the deflection segment 33, the light-directing optical element 8' has an entry section 34 where the light from the light sources 5 enters the light-directing optical element 8'. Downstream of the deflection segment 33, the light-directing optical element 8' has an exit section 35, where the light is directed toward the light entry surface 12 of the optical waveguide 7.

According to another embodiment of the invention, not shown in the drawings, the outer surface 19 of the cover lens 2, 2' can have an optical structure, preferably a micro-optical structure, that results in a desired diffusion of the light. If the micro-optical elements are small enough, i.e. preferably smaller than 1 mm, or smaller than 0.5 mm, they cannot be seen by the human eye, and are therefore not disruptive.

LIST OF REFERENCE SYMBOLS

1 housing
2, 2' cover lens
3 interior
4 1st light module
5 light source
6 optical unit

7 optical waveguide
8, 8' light-directing optical element
9 diffusion section
10 adjustment section
11 light emitting surface
12 light entry surface
13 printed circuit board
14 edge
15 edge
16 1st part
17 inner surface
18 2nd part
19 outer surface
20 environment
21, 21' intersection
22 flat surface
23 light emitting surface
24 2nd light module
25, 25' 2nd part
26 diffusing structure
27 diffusing structure
28 transparent component material
29 black component material
30 back surface
31 1st window
32 2nd window
33 deflection segment
34 entry section
E plane of extension
H main beam emission direction
d thickness
α angle
φ acute angle

We claim:

1. A lighting device for vehicles, the lighting device comprising:

a housing with an opening;

a cover lens that covers the opening in the housing;

a light module that contains a number of light sources and an optical unit for generating a predefined light distribution, the optical unit containing an optical waveguide that has a light entry surface and a light emitting surface, the optical waveguide being connected to the cover lens, wherein a first part of the optical waveguide, facing a light source, protrudes from an inner surface of the cover lens, or the light entry surface of the optical waveguide is flush with the inner surface of the cover lens, wherein a second part of the optical waveguide, facing away from the light source, protrudes from the outer surface of the cover lens, or the light emitting surface of the optical waveguide is flush with the outer surface of the cover lens, and wherein the cover lens and optical waveguide are produced in a two-component injection molding process, wherein a back of the cover lens contains a component material through which light cannot pass, at least where the component material surrounds the optical waveguide.

2. The lighting device according to claim 1, wherein the light entry surface on the optical waveguide is formed by an exposed end of the optical waveguide or the first part of the optical waveguide, and the light emitting surface of the optical waveguide is formed by an exposed end of the optical waveguide or the second part of the optical waveguide.

3. The lighting device according to claim 1, wherein the optical waveguide is integrally connected to the cover lens.

4. The lighting device according to claim 1, wherein there is a light-directing optical element on an upstream end of the waveguide.

5. The lighting device according to claim 4, wherein the light-directing optical element is a waveguide, lens, or reflector.

6. The lighting device according to claim 1, wherein there are numerous light sources upstream of a light-directing optical element.

7. The lighting device according to claim 1, wherein the light emitting surface on the optical waveguide has a diffusing optical element or optical structure.

8. The lighting device according to claim 1, wherein the cover lens and optical waveguide are produced in an injection molding process from a single transparent or tinted material.

9. The lighting device according to claim 1, wherein the cover lens has a first area through which light can pass from which the optical waveguide protrudes, and has a second area through which light from a light module can pass, wherein the light module is within an interior of the lighting device delimited by the cover lens and the housing.

10. The lighting device according to claim 1, wherein the optical waveguide is a flat waveguide with opposing flat surfaces where the light that enters the optical waveguide undergoes total internal reflection, and wherein the light entry surface and light emitting surface of the optical waveguide each form a narrow linear surface.

11. The lighting device according to claim 1, wherein the cover lens is curved in a plane at a right angle to an extension (E) of the optical waveguide, wherein edges of the cover lens meet at an angle (α) of 40° to 90°.

12. The lighting device according to claim 1, wherein the light emitting surface of the optical waveguide is perpendicular, horizontal, at an angle to, or curved in relation to a main beam direction (H), and an at least one flat surface of the optical waveguide bordering the light emitting surface has a diffusing optical structure.

13. The lighting device according to claim 1, wherein an outer surface of the cover lens has a diffusing structure.

14. The lighting device according to claim 1, wherein a diffusing optical structure is formed by numerous micro-optical elements which rise from a surface of the optical waveguide or are flush with a surface of the optical waveguide, and/or is formed by the cover lens, or an optical diffusing structure formed by etching, grinding, or laser processing.

* * * * *